United States Patent
Heemann et al.

(10) Patent No.: US 11,414,572 B2
(45) Date of Patent: *Aug. 16, 2022

(54) EXTRUDABLE PRESSURE SENSITIVE ADHESIVE BASED ON POLYBUTENE-1 SUITABLE FOR RECLOSABLE PACKAGINGS

(71) Applicant: HENKEL AG & CO. KGAA, Duesseldorf (DE)

(72) Inventors: Marcus Heemann, Neuss (DE); Sebastian Kostyra, Monheim (DE); Thomas Scheeren, Heinsberg (DE); Dirk Kasper, Duesseldorf (DE)

(73) Assignee: Henkel AG & CO, KGaA, Dusseldorf (DE)

( * ) Notice: Subject to any disclaimer, the term of this patent is extended or adjusted under 35 U.S.C. 154(b) by 125 days.

This patent is subject to a terminal disclaimer.

(21) Appl. No.: 16/226,972

(22) Filed: Dec. 20, 2018

(65) Prior Publication Data

US 2019/0119529 A1 Apr. 25, 2019

Related U.S. Application Data

(63) Continuation of application No. PCT/EP2017/063963, filed on Jun. 8, 2017.

(30) Foreign Application Priority Data

Jun. 20, 2016 (EP) .................................... 16175230

(51) Int. Cl.
*C09J 11/08* (2006.01)
*C09J 5/00* (2006.01)
*C09J 7/38* (2018.01)
*B32B 27/32* (2006.01)
*C09J 123/20* (2006.01)

(52) U.S. Cl.
CPC ............. *C09J 7/381* (2018.01); *B32B 27/32* (2013.01); *C09J 5/00* (2013.01); *C09J 11/08* (2013.01); *C09J 123/20* (2013.01); *C09J 2301/408* (2020.08); *C09J 2301/414* (2020.08); *C09J 2423/00* (2013.01)

(58) Field of Classification Search
CPC .... C09J 123/00; C09J 123/02; C09J 123/025; C09J 123/04; C09J 123/06; C09J 123/08; C09J 123/0807; C09J 123/0815; C09J 123/10; C09J 123/12; C09J 123/14; C09J 123/142; C09J 123/16; C09J 123/18; C09J 123/20; C09J 123/22; C09J 123/24; C09J 123/26; C09J 2301/312; C09J 11/08; C09J 5/00; B32B 27/32; B32B 7/12; B32B 2439/00; B32B 2553/00; B32B 37/12; B65D 77/12; A61J 1/03
USPC ................. 525/191, 237; 428/35.7
See application file for complete search history.

(56) References Cited

U.S. PATENT DOCUMENTS

| 3,644,252 | A | * | 2/1972 | Shenfeld | C09J 125/08 524/522 |
| 3,935,893 | A | | 2/1976 | Stang et al. | |
| 4,210,570 | A | * | 7/1980 | Trotter | C09J 123/142 524/271 |
| 4,691,858 | A | * | 9/1987 | Peer, Jr. | B65D 5/065 229/217 |
| 4,761,450 | A | † | 8/1988 | Lakshmanan | |
| 4,833,192 | A | * | 5/1989 | Lakshmanan | C09J 123/20 524/476 |
| 4,886,853 | A | † | 12/1989 | Foster | |
| 5,021,257 | A | | 6/1991 | Foster et al. | |
| 5,417,790 | A | * | 5/1995 | Petrou | G09F 3/10 156/249 |
| 6,114,261 | A | * | 9/2000 | Strelow | A61F 13/539 442/153 |
| 6,297,324 | B1 | * | 10/2001 | Briddell | C09J 123/16 525/237 |

(Continued)

FOREIGN PATENT DOCUMENTS

| CN | 1145085 A | 3/1997 |
| CN | 103154176 A | 6/2013 |

(Continued)

OTHER PUBLICATIONS

Eastman Tackifier Center: Resources for formulation archived online at https://web.archive.org/web/20150510141606/https://www.eastman.com/Markets/Tackifier_Center/Adhesive_Examples/Hot_Melt_Packaging/Pages/Hot_Melt_Packaging.aspx on Mar. 27, 2015 (Year: 2015).*

(Continued)

*Primary Examiner* — Lee E Sanderson
(74) *Attorney, Agent, or Firm* — Sun Hee Lehmann; Steven C. Bauman

(57) ABSTRACT

The present invention relates to a pressure sensitive adhesive composition comprising,
i) at least one butene-1 (co)polymer;
ii) at least one liquid tackifier;
iii) at least one solid tackifier;
iv) optionally at least one further (co)polymer, different from i);
v) optionally at least one additive.

Furthermore, the use of the pressure sensitive adhesive composition according to the invention as closing mean for a packaging unit for foods, for packaging units to be heated in a microwave or oven, for a closing mean for packaging unit for drugs, hygienic tissues, cleaning tissues or cosmetic tissues. An article comprising the pressure sensitive adhesive composition according to the invention and a method of obtaining the article.

8 Claims, No Drawings

(56) References Cited

U.S. PATENT DOCUMENTS

| | | | | |
|---|---|---|---|---|
| 2008/0214078 A1* | 9/2008 | Vanmarcke | ............. | C09J 7/387 442/151 |
| 2011/0135922 A1* | 6/2011 | Joseph | .................. | C09J 193/04 428/355 AC |
| 2011/0213067 A1* | 9/2011 | Moeller | ................. | C09J 153/00 524/505 |
| 2013/0202836 A1* | 8/2013 | Musacchi | ................. | C09J 7/38 428/41.3 |
| 2015/0065638 A1 | 3/2015 | LiPiShan et al. | | |

FOREIGN PATENT DOCUMENTS

| | | | | |
|---|---|---|---|---|
| DE | 102008026670 A1 * | 12/2009 | ............ | C09J 123/18 |
| RU | 2347731 C2 | 2/2009 | | |
| RU | 2447996 C2 | 4/2012 | | |
| RU | 2585787 C2 | 6/2016 | | |
| WO | 2004046214 A2 | 6/2004 | | |
| WO | 2005108442 A1 | 11/2005 | | |
| WO | 2005113622 A1 | 12/2005 | | |
| WO | 2012052429 A1 | 4/2012 | | |
| WO | 2016062797 A1 | 4/2016 | | |

OTHER PUBLICATIONS

The Wingtack Resin Product Bulletin published online by Cray Valley https://www.crayvalley.com/docs/tds/wingtack-resins-(3).pdf?sfvrsn=cab85eb0_2 and accessed on Apr. 1, 2021 (Year: 2021).*

\* cited by examiner
† cited by third party

EXTRUDABLE PRESSURE SENSITIVE ADHESIVE BASED ON POLYBUTENE-1 SUITABLE FOR RECLOSABLE PACKAGINGS

FIELD OF THE INVENTION

The present invention relates to Pressure sensitive adhesives (in the following referred to as PSA) based on polybutene-1 (co)polymers and further comprising a liquid and a solid tackifier, suitable for use in reclosable packaging, especially for the food industry. Furthermore, the present invention relates to the use of the pressure sensitive adhesive composition according to the invention as closing mean for a packaging unit for foods, for packaging units to be heated in a microwave or oven, for a closing mean for packaging unit for drugs, hygienic tissues, cleaning tissues or cosmetic tissues. Moreover, the present invention relates to an article comprising the adhesive according to the invention as an adhesive layer between two substrates and a method for manufacturing the article.

BACKGROUND OF THE INVENTION

The utilization of polybutene-1 (co)polymers in PSA has been generally disclosed in WO 2012/052429 A1. However, this reference only teaches the use of a single at room temperature solid tackifier. The thus obtained adhesives are suitable for reclosable packaging. However, their adhesion to substrates like PE or PET is mediocre in initial adhesion, adhesion after reclosing and viscosity which is important for the application of the adhesive in the manufacture step. Therefore, there is a need for PSAs based on polybutene-1 (co)polymers, which have improved adhesion properties, especially reclosability, as well as a sufficient viscosity and are suitable for reclosable packaging.

SUMMARY OF THE INVENTION

The inventors of the present invention have surprisingly found that the adhesion of PSA based on polybutene-1 (co)polymers can be improved and a sufficient viscosity can be reached if the PSA comprises two tackifiers. In particular a liquid and a solid tackifier. Furthermore, it has been found that the PSA according to the invention show a high flexibility at cold temperatures, a good adhesion and good film forming characteristics while being excellent for extrusion forming.

DETAILED DESCRIPTION OF THE INVENTION

In the following the present invention is described in more detail. Each described embodiment may be combined with any other embodiment or embodiments unless explicitly stated otherwise. In particular, any feature indicated as being preferred or advantageous may be combined with any other feature or features indicated as being preferred or advantageous.

As used herein, the singular forms "a", "an" and "the" should be interpreted as "at least one".

The terms "comprising", "comprises" and "comprised of" as used herein are synonymous with "including", "includes" or "containing", "contains", and are inclusive or open-ended and do not exclude additional, non-recited members, elements or method steps.

The recitation of numerical end points includes all numbers and fractions subsumed within the respective ranges, as well as the recited end points.

Unless otherwise defined, all terms used in the specification, including technical and scientific terms, have the meaning as commonly understood by one of ordinary skill in the art.

The term "essentially free" within the context of this invention is to be interpreted as the respective compound is contained in the composition in an amount of less than 5 wt.-%, 4 wt.-%, 3 wt.-%, 2 wt.-%, 1.5 wt.-%, 1 wt.-%, 0.75 wt.-%, 0.5 wt.-%, 0.25 wt.-%, or 0.1 wt.-%, based on the total weight of the composition, wherein the amounts are respectively more preferred in descending order. For example, 4 wt.-% is more preferred than 5 wt.-% and 3 wt.-% is more preferred than 4 wt.-%.

The term "hydrogenated hydrocarbon resin" refers to hydrocarbon resins which are at least 95%, preferably at least 98%, more preferably at least 99%, most preferably fully hydrogenated.

The term "(co)polymer" includes homopolymers, copolymers, block copolymers, and terpolymers.

In particular, the present invention relates to:
1. A pressure sensitive adhesive composition comprising, preferably consisting of
   i) at least one butene-1 (co)polymer;
   ii) at least one liquid tackifier;
   iii) at least one solid tackifier;
   iv) optionally at least one further (co)polymer, different from i);
   v) optionally at least one additive.
2. The pressure sensitive adhesive composition according to item 1, wherein the at least one butene-1 (co)polymer having a butene-1 content of 85 to 100% by mol, based on the butene-1 (co)polymer;
   more preferably 85 to 99% by mol and wherein the co-monomer is selected from alpha-olefins, more preferably ethylene and/or propylene;
   and/or preferably the butene-1 (co)polymer has an melt index (measured according to DIN EN ISO 1133-1: 2012-03; 2.16 kg, 190° C./10 min) of at most 10, more preferably at most 5;
   and/or preferably the butene-1 (co)polymer has a distribution of molecular weights Mw/Mn (measured via GPC using polystyrene standards) of lower than 4;
   and/or preferably the butene-1 (co)polymer has an instrinsic viscosity (measured in tetraline at 135° C.) of from 1 to 4 dL/g, more preferably of from 1.5 to 2.5 dL/g;
   and/or preferably the butene-1 (co)polymer has a crystallinity of less than 40% (measured via X-ray), more preferably less than 30%, most preferably lower than 20%;
   and/or preferably the butene-1 (co)polymer has a density of 0.899 g/cm$^3$ or less, more preferably of 0.895 g/cm$^3$ or less, even more preferably lower than 0.875 g/cm$^3$;
   and/or preferably the butene-1 (co)polymer has a shore A hardness of lower than 90, more preferably lower than 70 (measured according to DIN EN ISO 868:2003-10).
3. The pressure sensitive adhesive composition according to item 2, wherein the at least one (at 25° C.) liquid tackifier has a viscosity of 15 to 40 Pa*s (measured with Brookfield Thermosel according to DIN 53019-1:2008-09 at 140° C.);
   preferably, the at least one liquid tackifier is a hydrocarbon resin;

more preferably a hydrogenated hydrocarbon resin;
most preferably the at least one liquid tackifier comprises a compound selected from pentaerythritol, glycerol ester, terpen-phenol resins, cyclopentadien resins or mixtures thereof;
and/or the at least one liquid tackifier has a softening point (measured according to ASTM E28-99) of 0 to 25° C.; more preferably 5 to 10° C.

4. The pressure sensitive adhesive composition according to any of items 1 to 3, wherein the
the at least one (at 25° C.) solid tackifier has a viscosity of 0.5 to 5 Pa*s (measured with Brookfield Thermosel according to DIN 53019-1:2008-09 at 140° C.);
preferably, the at least one solid tackifier is a hydrocarbon resin;
more preferably a hydrogenated hydrocarbon resin;
most preferably the at least one solid tackifier comprises a compound selected from aromatic modified resins, terpen phenol resins, piperylene, 2-methyl-2-butene copolymers, cyclopentadien resins or mixtures thereof;
and/or the at least one solid tackifier has a softening point (measured according to ASTM E28-99) of 80 to 150° C.; more preferably 90 to 130° C., most preferably 95 to 115° C.

5. The pressure sensitive adhesive composition according to item 4, wherein at least two solid tackifier having a viscosity of 0.5 to 5 Pa*s are comprised in the composition.

6. The pressure sensitive adhesive composition according to any one of items 1 to 5, wherein at least one further polymer, different from i) comprises an olefin (co)polymer, preferably an alpha-olefin (co)polymer; more preferably metallocene catalyzed alpha-olefin (co)polymers, even more preferably an ethylene or octene alpha-olefin (co)polymer; most preferably an octane ethylene alpha-olefin copolymer;
and/or wherein the at least one further (co)polymer has an melt index has an melt index (measured according to DIN EN ISO 1133-1:2012-03; 2.16 kg, 190° C./10 min) of at most 100, more preferably at most 20.

7. The pressure sensitive adhesive composition according to any of items 1 to 6, wherein the at least one additive comprises a compound selected from plasticizers, like polyisobutylene or oils; waxes, like paraffinic and microcrystalline waxes as well as their hydrogenated forms, fischer-tropsch-waxes; stabilizers, like UV-stabilizers; and modifying agents, like terpolymers of ethylene, acrylic acid esters and maleic anhydride, antioxidants, or mixtures thereof.

8. The pressure sensitive adhesive composition according to any of items 1 to 7, wherein the composition has a viscosity of from 300 to 2,000 Pa*s at 200° C.; more preferably 600 to 1600 Pa*s; most preferably 800 to 1500 Pa*s (measured with Brookfield Thermosel according to DIN 53019-1:2008-09 at 200° C.).

9. The pressure sensitive adhesive composition according to any of items 1 to 8, wherein the composition when employed as a 20 μm thick adhesive layer between two substrates, preferably the substrates are based on PE, PP, OPP, PET, APET and modified materials thereof, has an adhesion when releasing the two substrates from each other of 5 to 8 N/15 mm, preferably 6 N/15 mm and after again pressing the two substrates together of 0.5 to 2 N/15 mm, preferably 1 N/15 mm (measured according to DIN EN ISO 11339:2010-06).

10. The pressure sensitive adhesive composition according to any one of items 1 to 9, wherein the composition comprises, preferably consists of:
35 to 74 wt.-%, preferably 40 to 60 wt.-% of i);
5 to 50 wt.-%, preferably 8 to 40 wt.-%, 9 to 20 wt.-% more preferably of ii);
10 to 50 wt.-%, preferably 15 to 40 wt.-%, more preferably 20 to 35 wt.-% of iii);
0 to 30 wt.-%, preferably 1 to 25 wt.-%, more preferably 5 to 20 wt.-% of iv); and
0 to 30 wt.-%, preferably 0.1 to 20 wt.-%, more preferably 1 to 15 wt.-% of v);
based on the total weight of the pressure sensitive adhesive composition.

11. Use of the pressure sensitive adhesive composition according to any of items 1 to 10 as closing mean for a packaging unit for foods, like cheese, sausage, meat, for packaging units to be heated in a microwave or oven, for a closing mean for packaging unit for drugs, hygienic tissues, cleaning tissues or cosmetic tissues.

12. An article comprising the composition of any one of items 1 to 10 as an adhesive layer between two substrates; preferably wherein the substrate material is independently selected from PE, LDPE, or PET substrates, more preferably wherein both substrates are PE, LDPE or PET substrates, most preferably wherein one substrate is PE and the other substrate is PET.

13. The article according to item 12, wherein the article is a packaging unit, preferably a food packaging unit, more preferably a reclosable packaging unit, most preferably a reclosable food packaging unit.

14. The article according to item 12, wherein the article is a packaging unit for drugs, hygienic tissues, cleaning tissues or cosmetic tissues, preferably a reclosable packaging unit for drugs, hygienic tissues, cleaning tissues or cosmetic tissues.

15. A method for manufacturing an article according to any one of items 12 to 14 comprising the following steps:
i) forming a film of the pressure sensitive adhesive composition according to any one of items 1 to 10 through a blow film head;
ii) bringing the formed film of step i) as middle layer in contact with two further layers.

The at least one butene-1 (co)polymer i) according to the present invention can for example be obtained by any one of the methods as disclosed in WO 2012/052429 A1. Commercially available butene-1 (co)polymers are available for example from Lyondell Basell under the tradename Koattro, like Koattro KT MR05. In embodiments, which comprise a copolymer or terpolymer, the content of butene-1 monomers is preferably at least 55%, more preferably at least 60%, most preferably at least 80%, based on the total monomer content of the respective polymer.

The at least one liquid tackifier ii) according to the present invention can be selected from liquid hydrocarbon resins and hydrogenated hydrocarbon resins, liquid polystyrenes, liquid rosin esters, liquid polyterpenes, liquid resins from polymerized and hydrogenated C9 hydrocarbon streams; liquid resins from polymerized and hydrogenated dicyclopentadiene species; liquid resins from polymerized and hydrogenated pure monomer species such as styrene, vinyl toluene, alpha-methyl styrene. The liquid tackifying resins include a liquid hydrocarbon resin comprising polymerized structures derived primarily from a stream of aliphatic petroleum derivatives, both dienes and mono-olefins, containing 4 to 6 carbon atoms. This polymerized product may optionally be further hydrogenated. Exemplary liquid tackifiers (having a Ring and Ball softening point below 25° C.) include polyterpenes such as Wingtack 10 commercially available from Sartomer, and Escorez 2520 commercially available from ExxonMobil Chemical.

Another useful liquid tackifier comprises predominantly cyclopentadiene species that have been polymerized and hydrogenated. Such a tackifying resin is commercially available from Exxon Chemical Company as ECR-327. Another liquid tackifying resin is a resin produced from the polymerization and hydrogenation of a pure monomer feedstock comprising styrene, vinyl toluene, and alpha-methyl styrene, such as the resin available from Eastmann Chemical Company as Regalrez 1018. Another useful liquid tackifying resin is a polymerized alpha-pinene resin having a softening point around 25° C. available from Arizona Chemical Company as Zonarez A-25.

In preferred embodiments the at least one liquid tackifier has a number average molecular weight of 150 to 1000 g/mol, preferably 250 to 950 g/mol, more preferably 300 to 900 g/mol measured via GPC employing polystyrene standards.

The at least one solid tackifier iii) according to the present invention can be selected from aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In a preferred embodiment, the at least one solid tackifier is non-polar, which indicates that the tackifier is substantially free of monomers having polar groups.

Preferred hydrocarbon resins for use as tackifiers or modifiers include:

Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Typically these resins are obtained from the cationic polymerization of compositions containing 1 one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

Resins obtained by the thermal polymerization of dicyclopentadiene, and/or the thermal polymerization of dimers or oligomers of cyclopentadiene and/or methylcyclopentadiene, optionally with vinylaromatics (such as styrene, alpha-methyl styrene, vinyl toluene, indene, methyl indene). The resins obtained after polymerization and separation of unreacted materials are preferably hydrogenated.

In a preferred embodiment the composition comprises at least two solid tackifiers. In a more preferred embodiment the first solid tackifier comprises a hydrogenated hydrocarbon resin and the second tackifier comprises a rosin.

The use of hydrogenated hydrocarbon resin as tackifier (solid as well as liquid) leads to an improved compatibility with the polymer i) of the present invention. In a further preferred embodiment, the tackifiers ii) and iii) are essentially free of aromatic modified tackifiers.

The optional at least one further polymer iv), different from i) comprises an olefin (co)polymer. Exemplarily commercially available copolymers are sold under the tradenames Vistamaxx, Infuse, Affinity and Engage from Dow Chemical Company and ExxonMobil. Those olefin (co) polymers are well known to the skilled person in the field of hot melts. Exemplarily polymers and the process of their manufacture are described in WO 2005/108442 A1, WO 2005/113622 A1, WO 2004/046214, and US20150065638 A1.

The PSA are obtained through commonly known kneader or extrusion processes. When using a blow extrusion-film technique it is favorable that the viscosity of the PSA is between 300 to 2,000 Pa*s at 200° C., more preferably 600 to 1,600 Pa*s at 200° C., most preferably 800 to 1500 Pa*s at 200° measured with Brookfield Thermosel according to DIN 53019-1:2008-09 at 200° C.

The material of substrates to be bonded are preferably PE (polyethylene), LDPE (low density polyethylene), PP (polypropylene), OPP (oriented polypropylene), PET (polyethylene terephthalate), APET (amorphous PET), CPET (crystalline PET). The materials can be modified, for examples containing an imprint.

EXAMPLES

Following Compounds were employed
Koattro KT MR 05: Polybutene-1 copolymer from Lyondell Basell
LR 1: Liquid resin Regalite R1010 from Eastman, hydrogenated hydrocarbon resin
SR 1: Solid resin Regalite R 1090 from Eastman, hydrogenated hydrocarbon resin, Softening point 85 to 91° C. (Ring and Ball; measured according to ASTM E 28)
SR 2: Solid resin Regalite S 1100 from Eastman, hydrogenated polycyclopentadien resin, Softening point 100° C. (Ring and Ball; measured according to ASTM E 28)
AR 3: Aromatic modified petroleum resin Wingtack Extra Test method for reclosability: A PSA was respectively prepared for the below mentioned compositions. The compounds were refluxed for 6 as 15% solution in cyclohexane. The mixture was coated on PE with a coating knife (300 µm) and dried for 1 day at room temperature, followed by 1 hour at 90° C. The dried layer (thickness of dried layer about 20 µm) was adhered on PE and a 25 mm thick strip was rolled up. The adhesion was measured after 24 hours and the initial value was measured. Immediately after the measurement the strip was rolled up again (with a 1 kg roller) and the adhesion was measured. This step was repeated three times. The adhesion was measured according to DIN EN ISO 11339: 2010-06 (unit N/25 mm; measurement 300 mm/Min). The reclosability given in table 1 was assessed at the fourth step.

TABLE 1

Examples according to the present invention, all numbers refer to wt.-%, based on the total weight of the adhesive

| Compound | Ex. 1 | Ex. 2 | Ex. 3 | Comp Ex. 4 | Comp. Ex. 5 |
| --- | --- | --- | --- | --- | --- |
| Koattro KT MR 05 | 40 | 70 | 60 | 60 | 60 |
| LR 1 | 39.5 | 14.5 | 9.5 | | |
| SR 1 | 20.0 | | 30.0 | 39.5 | |
| SR 2 | | 15.0 | | | |
| AR 3 | | | | | 39.5 |
| Stabilizer | 0.5 | 0.5 | 0.5 | 0.5 | 0.5 |
| Viscosity (200° C.) | o | ++ | ++ | ++ | ++ |
| Reclosability | ++ | + | ++ | −− | −− |

Results are given from — (bad), − (not sufficient), o (acceptable), + (good), ++ (very good)

Examples 1 to 3 according to the present invention show suitable viscosity while having good and very good reclosability properties. In contrast, the comparative examples do not have an acceptable reclosability.

The invention claimed is:

1. A pressure sensitive adhesive composition comprising:
   i) a butene-1 homopolymer, butene-1-ethylene copolymer, or butene-1-propylene copolymer, wherein the butene-1 content of the copolymer is at least 85 mol %;
   ii) at least one liquid tackifier having a viscosity of 15 to 40 Pa·s at 140° C.;
   iii) a first solid tackifier having a viscosity of from 0.5 to 5 Pa·s at 140° C., and a second solid tackifier, wherein the combined viscosity of the first solid tackifier and second solid tackifier is in the range of from 0.5 to 5 Pa·s at 140° C.;
   iv) optionally at least one further (co)polymer, different from i);
   v) optionally at least one additive;
wherein the composition has a viscosity of from 300 to 2,000 Pa·s at 200° C.

2. The pressure sensitive adhesive composition according to claim 1, wherein the at least one further (co)polymer iv) different from i) comprises an olefin copolymer.

3. The pressure sensitive adhesive composition according to claim 1, wherein the at least one additive is a compound selected from plasticizers; waxes; stabilizers; modifying agents; antioxidants or mixtures thereof.

4. The pressure sensitive adhesive composition according to claim 1, wherein the composition when employed as a 20 µm thick adhesive layer between two substrates has an adhesion when releasing the two substrates from each other of 5 to 8 N/15 mm and after again pressing the two substrates together of 0.5 to 2 N/15 mm.

5. An article comprising the composition of claim 1 as an adhesive layer between two substrates of a closing mean.

6. The article according to claim 5, wherein the article is a recloseable packaging unit.

7. The article according to claim 5, wherein the recloseable article is a recloseable packaging unit for food, drugs, hygienic tissues, cleaning tissues or cosmetic tissues.

8. A pressure sensitive adhesive composition comprising:
   i) 35 to 74 wt % of a butene-1 homopolymer, butene-1-ethylene copolymer, or butene-1-propylene copolymer, wherein the butene-1 content of the copolymer is at least 85 mol %;
   ii) 5 to 50 wt % of a liquid tackifier having a viscosity of from 15 to 40 Pa·s at 140° C.;
   iii) 10 to 50 wt % of a first solid tackifier and a second solid tackifier;
   iv) 0 to 30 wt % of a further (co)polymer different from i);
   v) 0 to 30 wt % of an additive;
wherein the wt % is based on the total weight of the pressure sensitive adhesive composition; and
wherein the composition has a viscosity of from 300 to 2,000 Pa·s at 200° C.

* * * * *

UNITED STATES PATENT AND TRADEMARK OFFICE
CERTIFICATE OF CORRECTION

| | | |
|---|---|---|
| PATENT NO. | : 11,414,572 B2 | |
| APPLICATION NO. | : 16/226972 | |
| DATED | : August 16, 2022 | |
| INVENTOR(S) | : Marcus Heemann et al. | |

It is certified that error appears in the above-identified patent and that said Letters Patent is hereby corrected as shown below:

In the Specification

Column 2, Line 23 change "block copolymers" to --blockcopolymers--.

Signed and Sealed this
Fourth Day of April, 2023

Katherine Kelly Vidal
*Director of the United States Patent and Trademark Office*